US009845088B2

(12) United States Patent
Hoess et al.

(10) Patent No.: US 9,845,088 B2
(45) Date of Patent: Dec. 19, 2017

(54) TORQUE OVERLAY DEVICE FOR A HYBRID DRIVE SYSTEM, AND A METHOD FOR OPERATING SUCH A HYBRID DRIVE SYSTEM

(71) Applicant: Bayerische Motoren Werke Aktiengesellschaft, Munich (DE)

(72) Inventors: Bernhard Hoess, Munich (DE); Robert Huber, Landshut (DE); Simon Rogge, Gilching (DE); Falk Prignitz, Erdweg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 22 days.

(21) Appl. No.: 14/818,514

(22) Filed: Aug. 5, 2015

(65) Prior Publication Data

US 2015/0336562 A1 Nov. 26, 2015

Related U.S. Application Data

(63) Continuation of application No. PCT/EP2014/051311, filed on Jan. 23, 2014.

(30) Foreign Application Priority Data

Feb. 6, 2013 (DE) .......... 10 2013 201 946
Jun. 25, 2013 (DE) .......... 10 2013 211 975

(51) Int. Cl.
*B60W 10/11* (2012.01)
*B60W 20/10* (2016.01)
(Continued)

(52) U.S. Cl.
CPC ............. *B60W 20/10* (2013.01); *B60K 6/365* (2013.01); *B60K 6/48* (2013.01); *B60K 6/547* (2013.01);
(Continued)

(58) Field of Classification Search
CPC ............... B60W 20/10; B60W 10/115; B60W 30/1882; B60W 20/00; B60W 10/08;
(Continued)

(56) References Cited

U.S. PATENT DOCUMENTS 6,629,026 B1 * 9/2003 Baraszu .............. B60K 6/48
180/65.25
8,257,214 B2 9/2012 Knoblauch
(Continued)

FOREIGN PATENT DOCUMENTS

AT 500 696 A2 2/2006
CN 102089173 A 6/2011
(Continued)

OTHER PUBLICATIONS

Reif et al., "Kraftfahrzeug-Hybridantriebe", Wiesbaden: Vieweg+Teubner, 2012. pp. 309-315—ISBN 978-3-8348-0722-9 (Eleven (11) pages).

(Continued)

*Primary Examiner* — Mary Cheung
(74) *Attorney, Agent, or Firm* — Crowell & Moring LLP

(57) ABSTRACT

The invention relates to a torque overlay device for use in a hybrid drive system for motor vehicles having an internal combustion engine, an electric motor and the torque overlay device, wherein a torque of the internal combustion engine and of the electric motor are overlaid using the torque overlay device. The torque overlay device is connected, on the output side, to a driven element of the vehicle, and includes a first and a second torque input and a torque output, as well as a first transmission device and a second transmission device. The electric motor can be coupled to the first torque input in a torque-resistant manner, and the internal combustion engine can be coupled to the second torque input in a torque resistant manner, where the first (Continued)

torque input is connected to the first transmission device and the second torque input is connected to the second transmission device, both in a torque-resistant manner. In addition, the transmission devices may each be coupled, on the driven side, to the torque output of the torque overlay device in a torque-resistant manner.

14 Claims, 3 Drawing Sheets

(51) Int. Cl.

| | |
|---|---|
| B60K 6/365 | (2007.10) |
| B60K 6/48 | (2007.10) |
| B60K 6/547 | (2007.10) |
| B60W 10/06 | (2006.01) |
| B60W 20/20 | (2016.01) |
| B60W 10/08 | (2006.01) |
| B60W 10/115 | (2012.01) |
| B60W 20/00 | (2016.01) |
| B60W 30/188 | (2012.01) |

(52) U.S. Cl.
CPC ............ *B60W 10/06* (2013.01); *B60W 10/08* (2013.01); *B60W 10/11* (2013.01); *B60W 10/115* (2013.01); *B60W 20/00* (2013.01); *B60W 20/20* (2013.01); *B60W 30/1882* (2013.01); *B60K 2006/4816* (2013.01); *B60W 2510/244* (2013.01); *B60W 2710/0666* (2013.01); *B60W 2710/083* (2013.01); *B60W 2710/105* (2013.01); *B60W 2710/1022* (2013.01); *F16H 2200/2005* (2013.01); *Y02T 10/6221* (2013.01); *Y02T 10/6256* (2013.01)

(58) Field of Classification Search
CPC ...... B60W 10/11; B60W 10/06; B60W 20/20; B60W 2710/0666; B60W 2710/083; B60W 2710/1022; B60W 2710/105; B60W 2510/244; B60K 6/547; B60K 6/365; B60K 6/48; B60K 2006/4816; Y02T 10/6256; Y02T 10/6221; F16H 2200/2005
See application file for complete search history.

(56) References Cited

U.S. PATENT DOCUMENTS

| | | | | |
|---|---|---|---|---|
| 8,858,376 | B2* | 10/2014 | Hart | ................ F16H 3/66 475/284 |
| 8,978,516 | B2 | 3/2015 | Funk et al. | |
| 2008/0039259 | A1* | 2/2008 | Maguire | ................ B60K 6/365 475/5 |
| 2009/0133946 | A1 | 5/2009 | Pels et al. | |
| 2009/0150035 | A1* | 6/2009 | Soliman | ................ B60K 6/442 701/54 |
| 2011/0118075 | A1* | 5/2011 | Kawasaki | ................ B60K 6/48 475/331 |
| 2011/0167956 | A1 | 7/2011 | Holmes et al. | |
| 2014/0243149 | A1* | 8/2014 | Holmes | ................ B60W 20/40 477/5 |

FOREIGN PATENT DOCUMENTS

| | | |
|---|---|---|
| CN | 102126425 A | 7/2011 |
| DE | 10 2008 035 451 A1 | 3/2009 |
| DE | 10 2008 029 287 A1 | 12/2009 |
| DE | 10 2010 063 092 A1 | 6/2011 |
| DE | 10 2010 030 567 A1 | 12/2011 |
| DE | 10 2011 089 708 A1 | 6/2013 |
| EP | 2 463 171 A1 | 6/2012 |
| WO | WO 2012/073651 A1 | 6/2012 |
| WO | WO 2012/131259 A1 | 10/2012 |

OTHER PUBLICATIONS

International Search Report dated Jun. 11, 2014 (Five (5) pages).
German Search Report dated Dec. 12, 2013, with Statement of Relevancy (Six (6) pages).
Chinese Office Action issued in Chinese counterpart application No. 201480006455.2 dated Jan. 17, 2017, with partial English translation (Twenty Four (24) pages).
Chinese Office Action issued in Chinese counterpart application No. 201480006455.2 dated Jul. 25, 2017, with partial English translation (Five (5) pages).

* cited by examiner

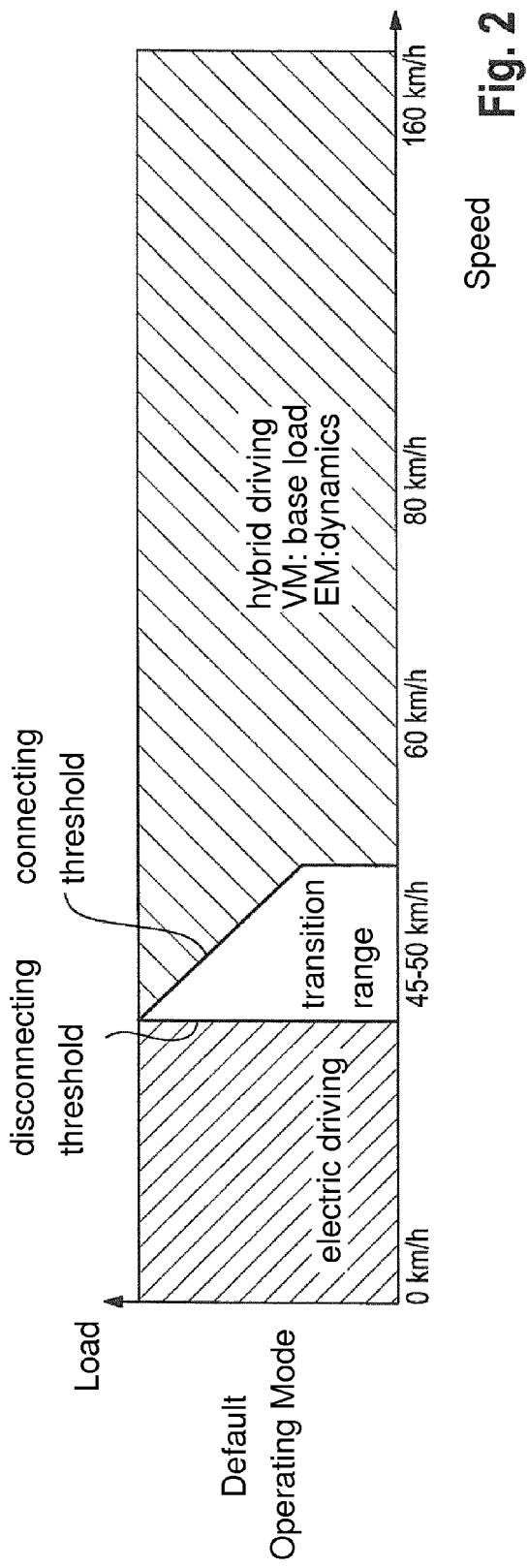
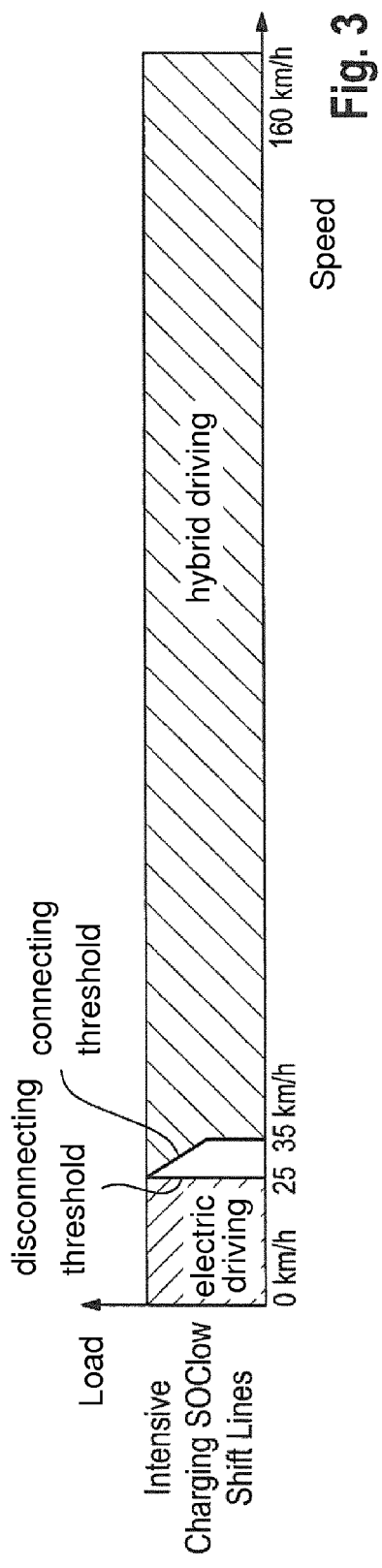

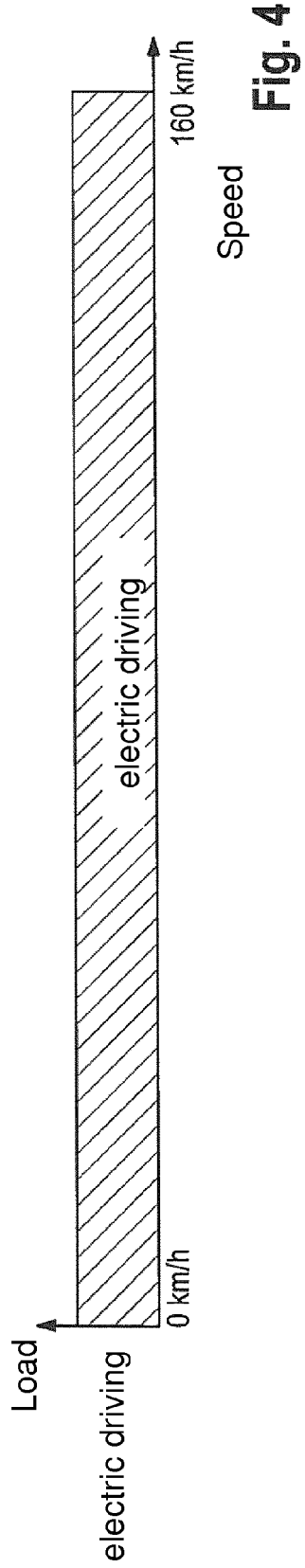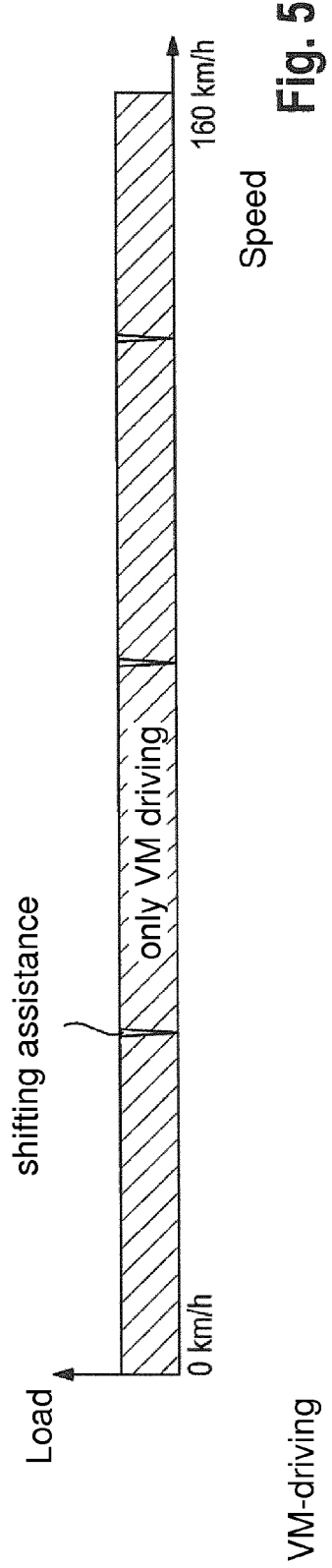

TORQUE OVERLAY DEVICE FOR A HYBRID DRIVE SYSTEM, AND A METHOD FOR OPERATING SUCH A HYBRID DRIVE SYSTEM

CROSS REFERENCE TO RELATED APPLICATIONS

This application is a continuation of PCT International Application No. PCT/EP2014/051311, filed Jan. 23, 2014, which claims priority under 35 U.S.C. §119 from German Patent Application No. 10 2013 201 946.7, filed Feb. 6, 2013 and 10 2013 211 975.5, filed Jun. 25, 2013, the entire disclosures of which are herein expressly incorporated by reference.

BACKGROUND AND SUMMARY OF THE INVENTION

The present invention relates to a torque superimposition device for a hybrid drive and to a method for operating the hybrid drive comprising the torque superimposition device according to the invention. The hybrid drive is particularly suited for use in a passenger motor vehicle.

Numerous hybrid drives are known in the prior art. In most instances, an electric motor is arranged in what is known as a hybrid parallel architecture in such a way that the drive torque of the electric motor can be connected to the output shaft of the internal combustion engine. The sum moment of internal combustion engine and electric motor is then conducted through the transmission, and thereafter to the driven output shaft of the vehicle. In recuperation mode, the moments flow with the reverse sign. Because the electric motor and internal combustion engine are coupled upstream of the transmission, the two propulsion systems, these being the internal combustion engine and the electric motor, are each operated in the same gear. In the hybrid vehicles presently available in the market, the selected gear is generally dependent on the respective resulting operating point of the internal combustion engine. The electric motor is often operated at a less than optimal operating point. This results in drawbacks, either in terms of power or from an energy point of view.

Other approaches provide for a power splitting of the drive torque. Two electric motors are required for this purpose, of which one is operated as a generator and the other as a motor. Power splitting results in energy losses.

The advantages and disadvantages of these hybrid architectures are known in the prior art.

A further approach is described in DE 10 2010 063 092 A1. A hybrid drive comprising a torque superimposition device is described here, which comprises a first gearing device associated with the electric motor, and a second gearing device associated with the internal combustion engine. Each gearing device has at least two alternatively selectable gear ratio steps. The moments of the electric motor and of the internal combustion engine are added on the output side downstream of the two gearing devices and supplied to the differential of the vehicle via the torque output of the torque superimposition device. In recuperation mode, the torque flows with the reverse sign. This topology allows the propulsion systems to be shifted separately from each other. This topology, however, is still not optimal with respect to the tractive force or tractive force development or tractive force continuity, in particular when aggregate power is needed during the respective shifting processes. In addition, the topology is complex in terms of the installation space.

It is the object of the invention to create a torque superimposition device that takes the above-described disadvantages better into account. In particular, a torque superposition device is to be created that allows operation of both the internal combustion engine and of the electric motor at the respective optimal operating point of the same. Moreover, the torque superimposition device is to be designed in such a way that the disadvantages in terms of power or energy known from the prior art are eliminated, and in particular that unnecessary energy losses are avoided. Moreover, the torque superimposition device is to be optimized with respect to the necessary installation space. In particular, a method for operating such a hybrid drive comprising a torque superimposition device according to the invention having high energy efficiency is also to be provided.

This object is achieved according to the invention by the torque superimposition device and the method disclosed and claimed herein. Further advantageous embodiments of the invention can be found in the dependent claims.

The torque superimposition device according to the invention is intended primarily for use in a hybrid drive for motor vehicles, in particular for use in passenger motor vehicles. For this purpose, the hybrid drive comprises an internal combustion engine, an electric motor, and the torque superimposition device designed according to the invention, wherein a torque of the electric motor can be superimposed on a torque of the internal combustion engine by means of the torque superimposition device. The torque superimposition device is moreover connected on the output side to an output of the vehicle.

The torque superimposition device implemented according to the invention comprises a first and a second torque input, a torque output, and a first gearing device and a second gearing device. The electric motor can be coupled to the first torque input in a torque-proof manner, and the internal combustion engine can be coupled to the second torque input in a torque-proof manner. The first torque input is connected to the first gearing device in a torque-proof manner, and the second torque input is connected to the second gearing device in a torque-proof manner. The gearing devices are coupled in each case on the output side to the torque output of the torque superimposition device in a torque-proof manner.

One idea of the invention that should be highlighted is therefore that, in principle, each propulsion system—these being the electric motor and the internal combustion engine—has a dedicated gearing device available. The drive torques of the propulsion systems are not added up until the output of the gearing devices. This summation, on the output side, of the drive torques in a positive torque flow direction downstream of the respective gearing devices constitutes a very essential functional difference compared to the hybrid gearboxes known from the prior art, in which the summation typically takes place upstream of the gearing device. The output-side summation makes it possible to select the respective shifted gear ratio steps of the propulsion systems independently of each other, and therefore in a way that is optimized for the particular propulsion system.

The first gearing device has at least two alternatively selectable gear ratio steps, and the second gearing device has at least one alternatively selectable gear ratio step.

According to the invention, the first gearing device comprises at least one planetary gear set to implement the at least two alternatively selectable gear ratio steps, while the second gearing device comprises at least one spur gear set to implement the at least one selectable gear ratio step.

It has been shown that, by combining a planetary gear set on the side of the first gearing device with at least one spur gear set on the side of the second gearing device, very favorable designs of the torque superimposition device in terms of the installation space can be found or achieved. Furthermore, the two alternatively selectable gear ratio steps of the first gearing device can be implemented very favorably from an efficiency point of view because a planetary gear set provides favorable conditions for this. In this way, the electric motor-based torque can be transmitted from the electric motor to the output with optimal efficiency, which results in an increase in the electric range of the vehicle equipped with the torque superimposition device implemented according to the invention. Due to the comparatively low energy storage densities of electric storage devices, for example of known Li-Ion storage devices, high efficiency in the electrical path of hybrid drives is particularly advantageous. It has been shown that it is advantageous to design the first gear ratio step of the first gearing device, serving as the first electric motor-based gear, in a driving power-oriented manner such that a desired high starting acceleration can be implemented by the electric motor, while the second gear ratio step of the first gearing device, serving as the second electric motor-based gear, should advantageously be designed such that the maximum speed of the vehicle can be implemented by the electric motor. Depending on the electric motor, it may also be advantageous to select a longer design for the second electric motor-based gear so as to open up additional energy efficiency potential via optimized operating points of the electric motor.

The planetary gear set can be either a single planetary gear set or an expanded planetary gear set, such as a Ravigneaux planetary gear set.

Moreover, the design of the second gearing device comprising at least one spur gear set allows the gear ratio of the spur gear set to be easily adapted within the scope of the layout of the drive train. It is therefore possible, with low modification complexity with respect to the gear ratio of the spur gear set of the second gearing device, to design the hybrid drive for other vehicle weights, for higher or lower power of the internal combustion engine, or for higher or lower maximum speeds of the vehicle. The person skilled in the art is familiar with such designs.

When the second gear ratio step is configured with only one selectable spur gear set, the gear ratio of the spur gear set will be expediently selected so that the maximum speed of the vehicle can be implemented with this gear ratio.

According to an advantageous refinement of the invention, each of the two gearing devices has at least two alternatively selectable gear ratio steps. The second gear ratio step of the second gearing device can then expediently be designed as an energy efficiency gear, which is to say having a longer gear ratio than the first gear ratio step of the second gearing device. This results in higher energy efficiency of the hybrid drive when operation takes place by means of the internal combustion engine.

According to a further refinement of the invention, however, it may also be advantageous to design the second gear ratio step of the second gearing device to have a shorter gear ratio than the first gear ratio step of the second gearing device, either within the meaning of a driving gear or even a starting gear.

So as to implement the at least two alternatively selectable gear ratio steps, the second gearing device expediently comprises at least two spur gear sets for this purpose, which in a preferred embodiment of the invention are arranged behind each other on an input shaft connected to the second torque input. Shifting elements for the selectability of the gear ratio step can therefore be designed uniformly within the second gearing device.

According to a particularly advantageous embodiment of the invention, the first gearing device comprises exactly one planetary gear set, wherein preferably exactly two gear ratio steps can alternatively be selected. It has been shown that two gear ratio steps are usually sufficient to be able to select the operating point of the electric motor in the hybrid drive designed according to the invention in a way that is specific to the propulsion system, both with respect to optimal driving power and with respect to high energy efficiency, under all driving conditions. At the same time, the installation space requirement is very low for only one planetary gear set of the first gearing device, so that the entire torque superimposition device can have a very compact design. This is particularly advantageous for integrating the hybrid drive into compact cars having very limited installation space with usually transversely arranged propulsion systems.

It is advantageous to expediently design the planetary gear set with at least one power-shift friction brake and/or friction clutch for the selection of the gear ratio steps. For example, the sun gear of the planetary gear set comprising a friction brake or friction clutch can be implemented so as to be breakable with respect to the housing, so that the movement of the planet carrier to the ring gear forms a gear ratio step when the sun gear is braked. Due to the power-shiftability of friction brakes and/or friction clutches, it is possible to implement very comfortable and fast shifting sequences without interruption of torque flow.

In a particularly advantageous refinement of the invention, the planetary gear set can be configured as a block to implement one of the gear ratio steps of the at least two alternatively selectable gear ratio steps. In a planetary gear set having a block configuration, the entire gear set rotates as a block, whereby toothing losses within the planetary gear set are eliminated. This is very desirable from an efficiency point of view. Accordingly, the gear ratio step that is to be selected to have a block configuration is that which, during operation of the vehicle, is engaged with the highest energy throughput in driving operation. It has been shown that this is typically the second, longer gear ratio step. However, depending on design, it is also possible for the first gear ratio step to be implemented by means of a planetary gear set having a block configuration.

According to a further expedient embodiment of the invention, the electric machine can be coupled to a ring gear of the planetary gear set in a torque-proof manner, a sun gear of the planetary gear set can be coupled to a housing of the torque superimposition device in a stationary manner, preferably by means of the power-shift friction brake, and a planet carrier of the planetary gear set is coupled to the torque output in a torque-proof manner so as to implement a further gear ratio step of the at least two alternatively selectable gear ratio steps. With an appropriately designed stationary gear ratio of the planetary gear set, such an interconnection of the planetary gear set can be used to implement gear ratios of up to 2 in a very compact construction with high moment load ability by braking the sun gear with respect to the housing.

The second gearing device moreover expediently comprises at least one form-locked and/or frictionally engaged clutch for the selectability of the at least one spur gear set designed as a gear ratio step. Advantageously, all gear ratio steps are designed with form-locked and/or frictionally engaged clutches. For example, dog clutches can be used as form-locked clutches. Dog clutches are generally not power-shift clutches, so that such shifting from one internal combustion engine-based gear ratio step or gear of the second gearing device into another internal combustion engine-based gear ratio step or gear must take place either with assistance from the electric motor, or when a tractive force reduction results on the output side during the shifting process. When the internal combustion engine-based power is small compared to the electric motor-based power, this will be less relevant; however, at higher internal combustion engine-based power levels, the driver may perceive this to be undesirable, in particular during full-load maneuvers that are carried out with aggregate power. In these cases, technologically more complex frictionally engaged clutches are preferable, which allow moment overlap during the shifting process from one gear ratio step to the next.

In many cases, it is advantageous if the at least one clutch is configured with a synchronizer element. Suitable synchronizer elements, such as single-cone to triple-cone synchronizers, are known in the prior art. Synchronizer elements can be used to passively reduce, which is to say without active engine intervention, rotational speed differentials between the shaft and the gear to be shifted in a short period of time sufficiently for the shifting process to be completed, for example by engagement of the dog clutches. Advantageously all clutches are implemented with synchronizer elements.

In an advantageous refinement of the invention, a fixed gearing element is arranged between the electric motor and the planetary gear set, preferably a spur gear set having a first spur gear facing the electric motor and a second spur gear facing the planetary gear set. The fixed gearing element preferably has a gear ratio between 1.5 and 4, particularly preferably a gear ratio between 1.5 and 3, most particularly preferably a gear ratio of 1.5 to 2. In this way, pre-gearing of the electric motor speed can be accomplished, so that the planetary gear set sees considerably lower rotational speeds. This is in particular advantageous for high-speed electric motors because in this way the rotational speed-dependent losses in bearings or gear meshing events are reduced in the planetary gear set.

To implement one or two further alternatively selectable gear ratio steps, a shaft of the second gearing device, which is connected to the second torque input, can particularly advantageously be connected to the first spur gear of the fixed gearing element designed as the spur gear set in an alternatively selectable and torque-proof manner. This essentially represents a "co-use" of the electric motor-based gear ratio steps that are available in the torque superimposition device as internal combustion engine-based gear ratio steps. The gear ratio steps of the propulsion systems, however, can then no longer be freely selected with respect to each other. Care must therefore be taken to ensure that these gears are selected appropriately for each other with respect to the two propulsion systems. This is the case when starting, for example, where the two propulsion systems are operated with a short gear ratio step, which is to say a high gear ratio. The same applies to an intermediate driving power gear, which is to be implemented in particular for maneuvers at high load or full load and aggregate power of the propulsion systems.

Another advantageous embodiment of the invention provides for the shaft of the second gearing device, which is connected to the second torque input, and a shaft of the first gearing device, which is connected to the first torque input, to be arranged aligned with each other, and for the end of the shaft of the second gearing device, which faces away from the second torque input, to be mounted in an end of the shaft of the first gearing device which is designed as a hollow shaft, the shaft being connected to the first torque input. This results in very compact shapes, however with a series arrangement of the propulsion systems comprising the interposed torque superimposition device, designed as a transmission.

So as to allow an alternatively selectable torque-proof connection of the shaft to the fixed gearing element, a form-locked and/or frictionally engaged clutch is advantageously arranged on the shaft for this purpose, and the clutch is preferably implemented with a synchronizer element.

The invention also covers a hybrid drive designed according to the invention, in particular for use in a passenger motor vehicle, comprising an internal combustion engine, an electric motor, and a torque superimposition device as described above. For this purpose, the internal combustion engine preferably has a power between 40 and 150 kW, particularly preferably a power between 50 and 100 kW. This involves continuous power that the internal combustion engine is able to provide. The electric motor expediently has a power of 30 to 60 kW, and the peak power corresponding to 2 to 3 times the continuous output. The invention is particularly suited for drive systems in which the peak power of the electric motor corresponds at least to the continuous power of the internal combustion engine, or is considerably above that. Short-term power reserves are in particular advantageous to provide assistance during shifting processes of the internal combustion engine.

The method according to the invention for operating a hybrid drive of a motor vehicle, in particular a passenger motor vehicle, wherein the hybrid drive comprises a torque superimposition device according to one of the preceding claims, provides for the method to comprise a normal hybrid operating mode having a first and a second control range.

The first control range covers a vehicle speed of zero up to an electric driving speed limit in the normal hybrid driving mode, and the second control range covers the electric driving speed limit in the normal hybrid driving mode up to the maximum speed of the vehicle. In the first control range, the drive torque of the motor vehicle is generated only by means of the electric motor, and in the second control range, the drive torque of the motor vehicle is generated in hybrid operation by a cooperation of the internal combustion engine and the electric motor. The internal combustion engine is operated independently of the load requirement of the driver input in the range of the optimal efficiency of the internal combustion engine.

According to an advantageous refinement, the internal combustion engine is operated briefly at loads above the range of optimal efficiency of the internal combustion engine only in a special driving power mode.

So as to ensure optimal utilization of the battery charge state within the meaning of the greatest possible electric driving component, but also to ensure optimal and energy-efficient use of the stored energy (electric, chemical), the method advantageously comprises a first special hybrid operating mode, which replaces the normal hybrid operating mode as a function of the battery charge state. This first special hybrid driving mode is activated when the battery charge state drops below a first limit value. Upon activation of the first special hybrid driving mode, the electric driving speed limit is simultaneously set to a value lower than the original value.

According to a preferred embodiment, the method moreover comprises a second special hybrid operating mode, which replaces the normal hybrid operating mode as a function of the battery charge state. This second special hybrid operating mode is activated when the battery charge state exceeds a second limit value. Optionally, a charging rate by the internal combustion engine that on average is positive can be used as an additional condition for activating the second special hybrid operating mode. Upon activation of the second special hybrid operating mode, the electric driving speed limit is simultaneously set to a value higher than the original value and/or the operation of the internal combustion engine is controlled to a load below the range of optimal efficiency of the internal combustion engine in such a way that the charging rate by the internal combustion engine decreases on average, is equal to zero, or even turns negative.

These measures are used to select the respective operating mode as a function of the battery charge state. The respective operating states are thus reproducible and comprehensible for the driver. Unexpected operating behavior of the drive system is therefore eliminated.

As a refinement, the above-described battery charge state-dependent selection of the operating mode can be supplemented and/or overridden with anticipatory functions. For example, using anticipatory functions (such as via a driver input and/or information from the navigation system), it is possible to deliberately increase (such as when entering Low-Emission Zones) or decrease (such as when charging options exist at the destination) the battery charge state. The battery charge can be controlled via the effective charging rate by the internal combustion engine and/or by changing the electric driving speed limit.

So as to convey to the driver a distinct electric driving experience or satisfy regulations, the method can moreover comprise an electric driving operating mode which the driver can optionally select and in which the drive torque of the motor vehicle is generated only by means of the electric motor across the entire speed range. Again, it is possible to control the selection of the electric driving operating mode using anticipatory functions (such as by driver input and/or information from the navigation system). By means of example, an electric driving operating mode can be selected in this way in city zones or zones defined by regulations, thereby forcing emission-free operation.

The torque superimposition unit according to the invention in combination with the method for operation according to the invention therefore allows efficient use of both types of energy to an extent as great as possible. The decision as to which type of energy is used is primarily made based on system efficiencies and energy efficiency reasons. By separating the base load (primarily implemented by the internal combustion engine) and dynamics for acceleration processes (primarily implemented by the electric motor), in conjunction with an increase in the load level for an efficient operation of the internal combustion engine and for the generation of the electric energy for boost processes, the present invention is particularly suited for internal combustion engines that have been optimized in terms of efficiency at the expense of responsiveness, dynamics, and the operating range.

Further details, features and advantages of the invention will be apparent from the following description of one exemplary embodiment based on the drawings. In the drawings:

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 shows a normal hybrid operating mode;
FIG. 3 shows a first special hybrid operating mode;
FIG. 4 shows an all-electric driving mode;
and
FIG. 5 shows an internal combustion engine-based driving mode.

DETAILED DESCRIPTION OF THE DRAWINGS

Figure 1:
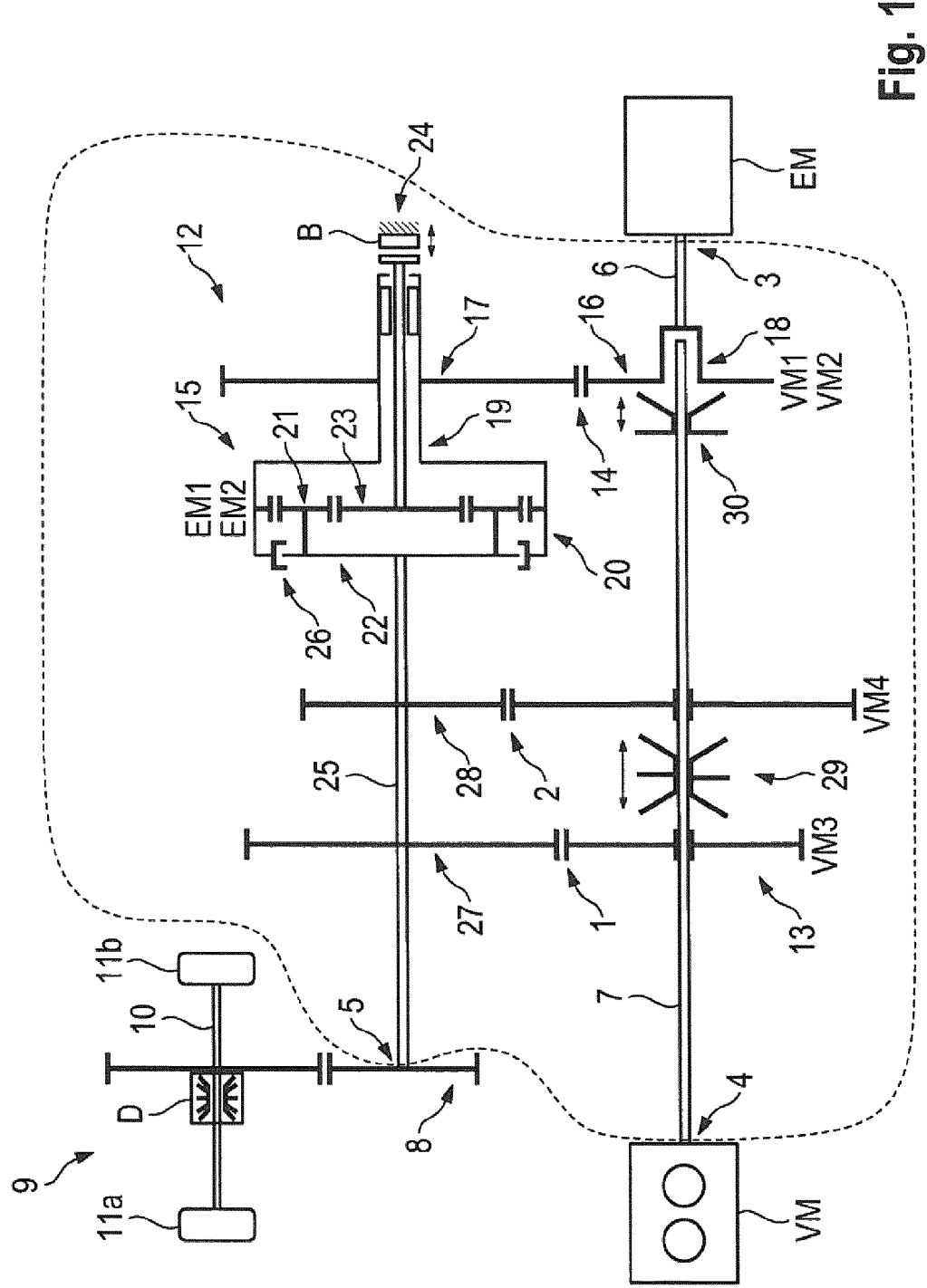
FIG. 1 shows an embodiment of the torque superimposition device according to the invention.

Only elements and components that are essential for gaining an understanding of the invention are shown in the figures. The shown exemplary embodiment shall be understood to have a purely instructive nature and is intended to provide a better understanding, without limiting the subject matter of the invention.

FIG. 1 shows a hybrid drive 1 implemented according to the invention for use in a passenger motor vehicle. The hybrid drive 1 comprises an internal combustion engine VM, an electric motor EM, and a torque superimposition device implemented according to the invention as a transmission 2. The transmission 2 comprises a first torque input 3 and a second torque input 4, as well as a torque output 5.

The electric motor EM is coupled to the first torque input 3 in a torque-proof manner, wherein the torque-proof coupling is achieved by means of a first shaft 6 here. For this purpose, the first shaft 6 is coupled to the rotor shaft (not shown in FIG. 1) of the electric motor EM in a torque-proof manner. Corresponding couplings and/or coupling elements for coupling two shafts are known in the prior art.

The internal combustion engine VM is coupled to the second torque input 4 in a torque-proof manner, wherein the torque-proof coupling is achieved by means of a second shaft 7 here. For this purpose, the second shaft 7 is coupled to the crankshaft (not shown in FIG. 1) of the internal combustion engine VM in a torque-proof manner. Corresponding couplings and/or coupling elements for coupling two shafts are known in the prior art.

The torque output 5 of the transmission 2 is coupled to an input spur gear 8 of a spur gear differential D of the output 9 of the vehicle in a torque-proof manner, wherein the coupling is achieved by means of an interference fit of the input spur gear 8 here. The spur gear differential D is implemented with a gear ratio between 3 and 4 here. The output 9 furthermore comprises the output shaft 10 and the wheels 11a and 11b. The hybrid drive according to the invention can be used as a front-wheel drive or, in principle a rear-wheel drive, standard drive, or even all-wheel drive. A front-wheel drive is shown in FIG. 1.

The transmission 2 implemented according to the invention comprises a first gearing device, which is implemented as a first subtransmission 12 here, and a second gearing device, which is implemented as a second subtransmission 13 here.

The first shaft 6 is implemented as part of the first subtransmission 12 here, and the second shaft 7 is implemented as part of the second subtransmission 13. In this way, the two subtransmissions are coupled to the respective propulsion systems EM and VM in a torque-proof manner via the respective torque inputs 3 and 4.

The first subtransmission 12 moreover comprises a fixed gearing element, which is designed as a spur gear set 14 here, as well as exactly one planetary gear set 15.

The spur gear set 14 is designed as a fixed gearing element and comprises a first spur gear 16 facing the electric motor EM and a second spur gear 17 facing the planetary gear set 15.

The first spur gear 16 of the spur gear set 14, which is designed as a fixed gearing element, is arranged at the end of the shaft 6 facing away from the torque input 3 on this shaft 6 by means of interference fit. The end of the shaft 6 facing away from the torque input 3 is implemented as a hollow shaft 18 in an end section of the shaft 3 here.

The second spur gear 17 of the spur gear set 14 designed as a fixed gearing element is arranged on a cylindrical outlet 19 of the ring gear 20 of the planetary gear set 15 by means of interference fit.

The spur gear set 14 designed as a fixed gearing element is implemented with a gear ratio of 2 here.

The exactly one planetary gear set 15 comprises the ring gear 20, the planet gears 21, the planet carrier 22, and the sun gear 23. The sun gear 23 can be braked with respect to a housing (not shown in FIG. 1) of the transmission 2 by means of the power-shift friction brake 24 in a stationary manner.

If braking of the sun gear 23 takes place in a stationary manner by means of the friction brake 24, the ring gear 20 and the planet gears 21, together with the coupled planet carrier 22, run on the stationary sun gear 23, whereby a torque that is introduced by the electric motor EM via the fixed gearing element 14 with a rotational speed is assigned a speed ratio and torque ratio corresponding to the gear ratio between the ring gear 20 and planet gears 21 or planet carrier 22, and is transmitted to the output shaft 25 via the planet carrier 22. By braking the sun gear 23, a first gear EM1 can therefore be implemented as a gear ratio step of the first subtransmission 12. The gear ratio of the planetary gear set when the sun gear 23 is braked in a stationary manner is between 1.5 and 1.9 here, preferably 1.8.

The second gear EM2, serving as the second gear ratio step of the first subtransmission 12, can be implemented by a block configuration of the planetary gear set 15. For this purpose, the clutch 26 between the ring gear 20 and planet carrier 22 is closed, whereby the entire planetary gear set 15 is configured as a block and rotates as a whole. The gear ratio of the planetary gear set 15 is therefore 1. A torque that is introduced by the electric motor EM via the fixed gearing element 14 with a rotational speed is assigned a speed ratio and torque ratio using the gear ratio of 1, and is transmitted to the output shaft 25 via the planet carrier 22.

In the exemplary embodiment shown in FIG. 1, exactly two gears can therefore be implemented as two alternatively selectable gear ratio steps of the first subtransmission 12.

The shifting transitions from first gear to second gear of the first subtransmission 12, and conversely, can be achieved by closing or opening the clutch 26, while simultaneously opening or braking the friction brake 24 under load, and can therefore be implemented without any drop in tractive force.

If both the clutch 26 as well as the friction brake 24 are open, no coupling of moment to the output shaft 25 exists. This operating state is of interest for the "stationary charging" function when the vehicle is stationary, with power flowing from the internal combustion engine VM to the electric motor EM operated as a generator in this operating state.

The output shaft 25 is designed as a torque output 5 of the transmission 2 on the side facing away from the planetary gear set 15.

The second subtransmission 13 moreover comprises two spur gear sets 27 and 28 so as to implement a first and a second alternatively selectable gear ratio step. The spur gear sets are implemented as an idler gear/fixed gear combination known from the prior art, wherein the idler gears of the spur gear sets 27 and 28 arranged on the second shaft 7 can be alternatively connected by means of a dog clutch 29 that acts on both sides and can be axially displaced on the shaft 7. The dog clutch 29 is composed of two sub dog clutches, which are both implemented as form-locked clutches. The two sub dog clutches moreover in each case additionally comprise a synchronizer element, which is a single-cone synchronizer here (not shown in FIG. 1).

As a result of form-locked engagement of the dog clutch 29 in the idler gear of the spur gear set 27, a torque-proof positive fit is established between the second shaft 7 and the spur gear set 27. Corresponding to the gear ratio of the spur gear set 27, a torque that is introduced by the internal combustion engine VM with a rotational speed is assigned a speed ratio and torque ratio and is transmitted via the fixed gear of the spur gear set 27 to the output shaft 25 rigidly connected to the fixed gear, and from there to the spur gear differential D.

The same mechanism of action applies to the spur gear set 28.

The gear ratio of the spur gear set 27 is between 1 and 1.5 for the exemplary embodiment shown here, and that of the spur gear set 28 is between 0.6 and 1.2. The gear ratio step comprising the spur gear set 27 is designed as the third gear VM3 of the second subtransmission 13 here, and the gear ratio step comprising the spur gear set 28 is designed as the fourth gear VM4 of the second subtransmission 13.

To implement the first gear VM1 and the second gear VM2 as two further alternatively selectable gear ratio steps of the second subtransmission, the second shaft 7 can be connected in a torque-proof manner to the first spur gear 16 of the spur gear set 14 designed as a fixed gearing element by means of form-locked dog clutches 30, alternatively to gears 3 and 4. If the dog clutch 30 is connected in a form-locked manner to the spur gear set 14, a torque supplied by the internal combustion engine VM is transmitted from the second shaft 7 via the spur gear set 14 to the planetary gear set 15. Depending on the shift state of the planetary gear set 15, the torque is transmitted corresponding to the gear ratio VM1=EM1 or VM2=EM2 to the output shaft 25, and from there to the spur gear differential D and the output 9.

The dog clutch 30 is configured with a single-cone synchronizer here.

VM1 is implemented as a short starting gear here. A starting clutch arranged directly downstream of the internal combustion engine VM is not shown in FIG. 1. A person skilled in the art will be familiar with the design and arrangement of such a starting clutch. VM2 is implemented as an intermediate gear on the driving power side here for the implementation of high-load or full-load maneuvers with aggregate power of the propulsion systems. VM3 is designed as a vmax gear here, and VM4 as an energy efficiency gear.

The gear ratios of the individual gear ratio steps are preferably in the following ranges:
  gear ratio of differential 9: approximately 2.5 to 4, particularly preferably 3.5 to 4
  gear ratio of planetary gear set 15:
  block configuration: 1
  with sun gear 23 braked in a stationary manner with respect to housing 24: approximately 1.5 to 2, particularly preferably 1.7 to 1.8
  gear ratio of fixed gearing element 14: approximately 1.5 to 3, particularly preferably 1.5 to 2
  gear ratio of spur gear set 27: approximately 0.9 to 1.4, particularly preferably 1 to 1.2.
  gear ratio of spur gear set 28: approximately 0.6 to 0.8, particularly preferably 0.7

The following preferred gear ratio ranges apply to the gears:
  gear ratio of EM1: approximately 11 to 14, particularly preferably approximately 12
  gear ratio of EM2: approximately 6 to 9, particularly preferably 6 to 7
  gear ratio of VM1: like gear ratio of EM1 (approximately 11 to 14, particularly preferably approximately 12)
  gear ratio of VM2: like gear ratio of EM2 (approximately 6 to 9, particularly preferably 7 to 8)
  gear ratio of VM3: approximately 3.5 to 5, particularly preferably 3.5 to 4
  gear ratio of VM4: approximately 2.5 to 3.5, particularly preferably approximately 3

According to FIG. 1, the second shaft 7 and the first shaft 6 are arranged aligned with each other here, wherein the end of the second shaft 7 facing away from the internal combustion engine VM is mounted in the end of the first shaft 6 designed as the hollow shaft 18.

The hybrid drive implemented in FIG. 1 has a very compact design. With respect to gears VM3 and VM4, as well as EM1 and EM2, the propulsion systems can be individually activated in a propulsion system-specific manner, whereby high driving dynamics and high energy efficiency are achieved. Due to the very compact design of the transmission having few gear meshing events in the respective moment paths, an extremely good efficiency of the transmission is achieved compared to transmissions known from the prior art. Moreover, the shifting processes between EM1 and EM2 (and also between VM1 and VM2) can be implemented without interruption of torque flow. Shifting processes from VM2 to VM3 and VM4 are carried out with assistance from the electric machine EM, and thus are carried out with sufficiently good shifting quality.

The hybrid drive of a motor vehicle, which comprises the above-described torque superimposition device, is advantageously operated so as to comprise a normal hybrid operating mode having a first and a second control range, as shown in FIG. 2.

The first control range covers a vehicle speed of zero up to an electric driving speed limit, for example approximately 60 km/h. The second control range covers the electric driving speed limit up to the maximum speed of the vehicle.

It is advantageous to define the electric driving speed limit as a connecting and disconnecting threshold for the internal combustion engine. The connecting threshold is then the driving speed value at which the switch is made from the first control range to the second control range as the driving speed increases. The disconnecting threshold is then the driving speed value at which the switch is made from the second control range to the first control range as the driving speed decreases.

The connecting threshold and disconnecting threshold are usually approximately 10 to 15 km/h apart from each other.

In the first control range, the drive torque of the motor vehicle is generated only by means of the electric motor EM, and in the second control range, the drive torque of the motor vehicle is generated in hybrid operation by the cooperation of the internal combustion engine VM and the electric motor EM.

The division into two control ranges makes it possible to optimally design the drive configuration in each case from an energy point of view. From an energy efficiency view, it is therefore advantageous to drive by means of the electric motor in the first control range. Here, the electric motor has a higher efficiency than would be possible with the internal combustion engine propulsion system. If additionally the amount of energy required for the electric motor-based operation was made available via charging from a power grid, this can result in ecological $CO_2$ neutrality of these driving states. In addition to energy efficiency, the emission-free operation, such as in inner-city areas, is another criterion to select the electric driving speed limits. With respect to both criteria, an electric driving speed in the range of approximately 60 km/h constitutes a good compromise during normal operation.

In the second control range, on the other hand, it is more advantageous from an energy efficiency and efficiency point of view to drive in a combined operating mode, this being the interaction between internal combustion engine and electric motor.

It is particularly advantageous from an energy point of view to consistently operate the internal combustion engine in continuous operation, for example along the beopt line of the same, and to supply the brief dynamics required for the driving task via the electric motor. Dynamics here shall be understood to mean both positive dynamics within the meaning of an acceleration of the vehicle, as well as negative dynamics within the meaning of a retardation of the vehicle.

In addition to optimal energy efficiency of the hybrid drive in each operating and driving state of the vehicle, the method according to the invention also ensures that vehicles comprising such a hybrid drive have a total range that is comparable to conventional vehicles operated by internal combustion engines, while also having a high electric range, whereby such a vehicle is suitable for both city operation, where optionally entry restrictions may exist for operation only by means of electric motor, and for long distances, without necessitating complex and time-consuming electricity "refueling."

The generation of the drive torque in the first control range according to a control strategy according to the invention differs from methods of comparable hybrid drives that are typically known from the prior art also in that no activation of the combustion engine for power compensation is permitted even during acceleration processes. On the one hand, the operation of the first control range according to the invention ensures that driving takes place exclusively by means of the electric motor in the first control range; on the other hand, such activation of the combustion engine for power compensation known from the prior art can result in a worsening of the efficiency and in problems regarding emissions and warm-up behavior of the internal combustion engine.

If the power requirement exceeds the power provision of the electric motor (for example, launch control function), activation of the internal combustion engine for power compensation can take place during acceleration phases within the meaning of a special function for optimal use of the aggregate power so as to achieve maximal driving power.

The internal combustion engine VM is operated independently of the load requirement of the driver input in the range of optimal efficiency of the internal combustion engine VM, or close thereto. The control according to the invention of the internal combustion engine-based operation at optimal efficiency of the internal combustion engine also includes setting the internal combustion engine-based operating point to an optimal system efficiency, which results from the efficiency with internal combustion engine operation at the respective internal combustion engine-based operating point, and a charge/discharge efficiency of the electric energy storage unit at the charge or discharge power of the high-voltage battery system resulting at the respective internal combustion engine-based operating point, the efficiency of the control electronics and of the electric motor when operated as a generator, and the respective driving task.

It is therefore possible that a lower efficiency than the maximum possible efficiency (beopt efficiency) of the combustion engine is set so as to optimize the system efficiency. This is particularly the case when a considerable charging rate would be generated if the combustion engine were set to the maximum possible efficiency, which would result in a disproportionate degradation of the efficiency of the high-voltage battery system.

Moreover, a special driving power operating mode is possible. It is only in this special driving power operating mode that the internal combustion engine VM is operated briefly at loads above the range of optimal efficiency of the internal combustion engine VM. In this way, it becomes possible for the maximum power of the internal combustion engine available in this driving state of the vehicle to be briefly accessed, even if this results in a deterioration of the efficiency of the internal combustion engine-based operation.

The method according to the invention moreover comprises a first special hybrid operating mode, which replaces the normal hybrid operating mode as a function of the battery charge state. This first special hybrid operating mode is activated when the battery charge state drops below a first limit value. Upon activation of the first special hybrid operating mode, the electric driving speed limit is set to a value lower than the original value.

The transition from normal hybrid operating mode to the first special hybrid operating mode can also take place continuously or steplessly. In particular, such continuous or stepless setting of the respective operating mode can also be carried out based on information about the desired driving route and the current traffic situation (anticipatory function).

Overall, this means that a first control range, in which driving takes place solely by means of the electric motor, is reduced toward lower speeds as the battery charge state decreases. In the extreme case of a completely discharged battery state, this could cause the transition into the second control range to already take place at 0 km/h. In addition, the operating point of the combustion engine can be shifted above the range of optimal efficiency toward full load when the battery charge state is low and the charging balance is negative, so as to generate a higher charging rate.

Conventional operating strategies typically degrade in this case via the load, which is to say that a switch into hybrid operation is already made with a lower load requirement when the battery charge state decreases.

The method moreover comprises a second special hybrid operating mode, which replaces the normal hybrid operating mode as a function of the battery charge state. The second special hybrid operating mode is activated when the battery charge state exceeds a second limit value and a charging rate of the internal combustion engine is greater than zero. Upon activation of the second special hybrid operating mode, the electric driving speed limit can be set to a value higher than the original value and/or the operation of the internal combustion engine VM is adjusted to a load below the range of optimal efficiency of the internal combustion engine VM, in such a way that the charging rate by the internal combustion engine VM is equal to zero.

The transition from normal operating mode to the second special operating mode also advantageously takes place continuously or steplessly, and particularly advantageously by including anticipatory functions and/or as a function of the battery charge state.

In addition to the system efficiencies, the battery charge state is a criterion in both operating modes for the selection of the operating point of the internal combustion engine, and therefore also for the charging rate. If battery charge states are very high (optionally in conjunction with a positive average charging balance), the charging rate is reduced to zero or into the negative range; if battery charge states are very low (optionally in conjunction with a negative average charging balance) it is increased up to full load of the combustion engine, even if this results in disadvantages in the efficiency of the combustion engine.

In many cases it will be advantageous for fuel to continue to be supplied to the internal combustion engine at a constant operating point in the second control range even in coasting operation, which is referred to as fired coasting. Fired coasting is in particular of advantage when a large amount of charging energy must be generated over a short time.

Moreover, the method comprises an electric driving operating mode which the driver can optionally select, as shown in FIG. 4, and in which the drive torque of the motor vehicle is generated only by means of the electric motor EM across the entire speed range.

Finally, as shown in FIG. 5, a pure internal combustion engine-based operation can also be implemented. If high shifting comfort is desired, the electric motor has to assume the assistance function during the shifting process only briefly in a pure internal combustion engine-based operation.

The above description of the present invention serves only illustrative purposes and is not intended to restrict the invention. Within the context of the invention, various changes and modifications are possible without departing from the scope of the invention or the equivalents thereof.

LIST OF REFERENCE NUMERALS

1 hybrid drive
2 transmission
3 first torque input
4 second torque input
5 torque output
6 first shaft
7 second shaft
8 input spur gear
9 output
10 driven shaft
11a wheels
11b wheels
12 first subtransmission 13 second subtransmission
14 spur gear set
15 planetary gear set
16 first spur gear
17 second spur gear
18 hollow shaft
19 outlet
20 ring gear
21 planet gears
22 planet carrier
23 sun gear
24 friction brake
25 output shaft
26 clutch
27 spur gear set
28 spur gear set
29 dog clutch
30 dog clutch
D spur gear differential
EM electric motor
EM1 first gear
EM2 second gear
VM internal combustion engine
VM1 first gear
VM2 second gear
VM3 third gear
VM4 fourth gear The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A torque superimposition device of a hybrid drive of a vehicle, the torque superimposition device comprising:
   a first torque input torque-proof coupled to an electric motor of the hybrid drive;
   a second torque input torque-proof coupled to an internal combustion engine of the hybrid drive;
   a torque output coupled to a drive input of the vehicle;
   a first gearing device torque-proof coupled to the first torque input and torque-proof coupled to the torque output, the first gearing device comprising: at least two alternatively selectable gear ratio steps, at least one planetary gear set configured to implement the at least two alternatively selectable gear ratio steps; and
   a second gearing device torque-proof coupled to the second torque input and torque-proof coupled to the torque output, the second gearing device comprising: at least one alternatively selectable gear ratio step, and at least one spur gear set configured to implement the at least one selectable gear ratio step,
   wherein torque of the electric motor is superimposed on torque of the internal combustion engine via the torque superimposition device.

2. The torque superimposition device according to claim 1, wherein each of the first and second gearing devices has at least two alternatively selectable gear ratio steps.

3. The torque superimposition device according to claim 1, wherein the second gearing device comprises at least two spur gear sets implementing the at least two alternatively selectable gear ratio steps.

4. The torque superimposition device according to claim 1, wherein the first gearing device comprises exactly one planetary gear set, wherein exactly two gear ratio steps can be alternatively selected.

5. The torque superimposition device according to claim 1, wherein the planetary gear set is configured with at least one of a power-shift friction brake and a friction clutch to select the gear ratio steps.

6. The torque superimposition device according to claim 1, wherein the planetary gear set is configured as a block to implement one of the gear ratio steps of the at least two alternatively selectable gear ratio steps.

7. The torque superimposition device according to claim 1, wherein the electric machine is coupled to a ring gear of the planetary gear set in a torque-proof manner, a sun gear of the planetary gear set is coupled to a housing of the torque superimposition device in a stationary manner by the power-shift friction brake, and a planet carrier of the planetary gear set is coupled to the torque output in a torque-proof manner in order to implement a further gear ratio step of the at least two alternatively selectable gear ratio steps.

8. The torque superimposition device according to either claim 7, wherein at least one of a form-locked and frictionally engaged clutch is arranged on the shaft, and the clutch is implemented with a synchronizer element so as to alternatively selectably connect the shaft to the fixed gearing element in a torque-proof manner.

9. The torque superimposition device according to claim 1, wherein the second gearing device comprises at least one form-locked and frictionally engaged clutch configured for the selection of the at least one spur gear set configured as a gear ratio step.

10. The torque superimposition device according to claim 9, wherein the at least one clutch is implemented with a synchronizer element.

11. The torque superimposition device according to claim 1, wherein a fixed gearing element is arranged between the electric motor and the planetary gear set, a spur gear set having a first spur gear facing the electric motor and a second spur gear facing the planetary gear set, wherein the fixed gearing element has a gear ratio between 1.5 and 3.

12. The torque superimposition device according to claim 11, wherein a shaft of the second gearing device, which is connected to the second torque input, is connectable to the first spur gear of the fixed gearing element configured as the spur gear set in an alternatively selectable and torque-proof manner so as to implement one or two further alternatively selectable gear ratio steps.

13. The torque superimposition device according to claim 1,
   wherein the shaft of the second gearing device, which is connected to the second torque input, and a shaft of the first gearing device, which is connected to the first torque input, are arranged aligned with each other, and
   wherein the end of the shaft of the second gearing device, which faces away from the second torque input, is mounted in an end of the shaft of the first gearing device, which is designed as the hollow shaft, said shaft being connected to the first torque input.

14. A hybrid drive of a vehicle, the hybrid drive comprising:
   an internal combustion engine having a power between 40 and 150 kW,
   an electric motor having a continuous power of between 30 and 60 kW, and a peak power of 2 to 3 times the continuous power, and a torque superimposition device comprising:
- a first torque input torque-proof coupled to the electric motor;
- a second torque input torque-proof coupled to the internal combustion engine;
- a torque output coupled to a drive input of the vehicle;
- a first gearing device torque-proof coupled to the first torque input and torque-proof coupled to the torque output, the first gearing device comprising: at least two alternatively selectable gear ratio steps, and at least one planetary gear set configured to implement the at least two alternatively selectable gear ratio steps; and
- a second gearing device torque-proof coupled to the second torque input and torque-proof coupled to the torque output, the second gearing device comprising: at least one alternatively selectable gear ratio step, and at least one spur gear set configured to implement the at least one selectable gear ratio step,
- wherein torque of the electric motor is superimposed on torque of the internal combustion engine via the torque superimposition device.

* * * * *